United States Patent
Al-Yami et al.

(10) Patent No.: US 10,538,692 B2
(45) Date of Patent: Jan. 21, 2020

(54) DEVELOPMENT OF ANTI-BIT BALLING FLUIDS

(71) Applicant: Saudi Arabian Oil Company, Dhahran (SA)

(72) Inventors: Abdullah Al-Yami, Dhahran (SA); Abdulaziz A. Ba Hamdan, Dammam (SA); Saleh A. Haidary, Dhahran (SA); Vikrant Wagle, Alqaiq (SA); Hussain AlBahrani, Qatif (SA); Ali Safran, Dhahran (SA); Nasser AlHareth, Ras Tanura (SA); Abdulla H. Awadh, Dammam (SA)

(73) Assignee: Saudi Arabian Oil Company, Dayton (SA)

( * ) Notice: Subject to any disclaimer, the term of this patent is extended or adjusted under 35 U.S.C. 154(b) by 0 days.

(21) Appl. No.: 16/451,167

(22) Filed: Jun. 25, 2019

(65) Prior Publication Data
US 2019/0309210 A1 Oct. 10, 2019

Related U.S. Application Data

(60) Continuation of application No. 15/922,077, filed on Mar. 15, 2018, now Pat. No. 10,377,939, which is a
(Continued)

(51) Int. Cl.
*C09K 8/24* (2006.01)
*C09K 8/20* (2006.01)
(Continued)

(52) U.S. Cl.
CPC ............ *C09K 8/24* (2013.01); *B01F 17/0021* (2013.01); *B01F 17/0042* (2013.01);
(Continued)

(58) Field of Classification Search
None
See application file for complete search history.

(56) References Cited

U.S. PATENT DOCUMENTS 2,589,949 A    3/1952   Meadors
2,782,163 A    2/1957   Wilson
(Continued)

FOREIGN PATENT DOCUMENTS

AU    5117264 A     5/1967
CA    2495811 A1    3/2004
(Continued)

OTHER PUBLICATIONS

Office Action dated Apr. 4, 2019 pertaining to U.S. Appl. No. 15/586,543, filed May 4, 2017, 23 pgs.
(Continued)

*Primary Examiner* — Andrew Sue-Ako
(74) *Attorney, Agent, or Firm* — Dinsmore & Shohl, LLP

(57) ABSTRACT

Anti-bit balling drilling fluids and methods of making and using drilling fluids are provided. The anti-bit balling drilling fluid contains water, a clay-based component, and at least one of a surfactant having the formula: $R-(OC_2H_4)_x-OH$, where R is a hydrocarbyl group having from 10 to 20 carbon atoms and x is an integer from 1 and 10, or a polyethylene glycol having the formula: $H-(O-CH_2-CH_2)_n-OH$, where n is an integer from 1 to 50. Methods of making and using these drilling fluids are also provided.

7 Claims, 2 Drawing Sheets

Related U.S. Application Data division of application No. 15/485,479, filed on Apr. 12, 2017, now Pat. No. 10,266,745.

(60) Provisional application No. 62/454,189, filed on Feb. 3, 2017, provisional application No. 62/454,192, filed on Feb. 3, 2017.

(51) Int. Cl.

| | |
|---|---|
| *C09K 8/22* | (2006.01) |
| *C04B 28/08* | (2006.01) |
| *E21B 21/00* | (2006.01) |
| *C04B 24/02* | (2006.01) |
| *C04B 28/02* | (2006.01) |
| *C04B 28/04* | (2006.01) |
| *C09K 8/74* | (2006.01) |
| *E21B 43/25* | (2006.01) |
| *C09K 8/03* | (2006.01) |
| *B01F 17/00* | (2006.01) |
| *C09K 8/40* | (2006.01) |
| *E21B 33/14* | (2006.01) |
| *C09K 8/035* | (2006.01) |
| *C09K 8/08* | (2006.01) |
| *C09K 8/42* | (2006.01) |
| *C09K 8/48* | (2006.01) |
| *C04B 24/08* | (2006.01) |
| *C04B 7/52* | (2006.01) |
| *C09K 8/46* | (2006.01) |
| *C09K 8/04* | (2006.01) |
| *C04B 14/06* | (2006.01) |
| *C04B 38/02* | (2006.01) |
| *C10M 111/04* | (2006.01) |
| *C10M 105/62* | (2006.01) |
| *C10M 173/00* | (2006.01) |
| *C09K 8/467* | (2006.01) |
| *C09K 8/487* | (2006.01) |
| *C10M 105/18* | (2006.01) |
| *C10M 107/34* | (2006.01) |
| *C04B 103/46* | (2006.01) |
| *C04B 111/00* | (2006.01) |
| *C04B 103/40* | (2006.01) |

(52) U.S. Cl.
CPC .......... *B01F 17/0092* (2013.01); *C04B 7/527* (2013.01); *C04B 14/06* (2013.01); *C04B 24/02* (2013.01); *C04B 24/026* (2013.01); *C04B 24/085* (2013.01); *C04B 28/02* (2013.01); *C04B 28/04* (2013.01); *C04B 28/08* (2013.01); *C04B 38/02* (2013.01); *C09K 8/032* (2013.01); *C09K 8/035* (2013.01); *C09K 8/04* (2013.01); *C09K 8/08* (2013.01); *C09K 8/20* (2013.01); *C09K 8/22* (2013.01); *C09K 8/40* (2013.01); *C09K 8/424* (2013.01); *C09K 8/46* (2013.01); *C09K 8/467* (2013.01); *C09K 8/48* (2013.01); *C09K 8/487* (2013.01); *C09K 8/74* (2013.01); *C10M 105/18* (2013.01); *C10M 105/62* (2013.01); *C10M 107/34* (2013.01); *C10M 111/04* (2013.01); *C10M 173/00* (2013.01); *E21B 21/00* (2013.01); *E21B 21/002* (2013.01); *E21B 21/003* (2013.01); *E21B 33/14* (2013.01); *E21B 43/25* (2013.01); *C04B 2103/40* (2013.01); *C04B 2103/46* (2013.01); *C04B 2111/00068* (2013.01); *C04B 2201/20* (2013.01); *C09K 2208/12* (2013.01); *C09K 2208/34* (2013.01); *C10M 2201/062* (2013.01); *C10M 2201/08* (2013.01); *C10M 2201/103* (2013.01); *C10M 2207/003* (2013.01); *C10M 2207/046* (2013.01); *C10M 2209/104* (2013.01); *C10M 2209/108* (2013.01); *C10M 2209/1045* (2013.01); *C10M 2215/042* (2013.01); *C10M 2215/08* (2013.01); *C10M 2215/265* (2013.01); *C10M 2215/28* (2013.01); *C10M 2217/044* (2013.01); *C10N 2220/021* (2013.01); *C10N 2220/022* (2013.01); *C10N 2220/032* (2013.01); *C10N 2230/06* (2013.01); *C10N 2240/401* (2013.01); *C10N 2250/022* (2013.01); *Y02W 30/92* (2015.05); *Y02W 30/94* (2015.05)

(56) References Cited

U.S. PATENT DOCUMENTS

| | | |
|---|---|---|
| 2,786,027 A | 3/1957 | Salathiel |
| 3,000,826 A | 9/1961 | Gililland |
| 3,044,959 A | 7/1962 | Martin |
| 3,048,538 A | 8/1962 | Rosenberg et al. |
| 3,319,714 A | 5/1967 | Knox |
| 3,353,603 A | 11/1967 | Knight |
| 3,720,610 A | 3/1973 | Erasmus |
| 3,816,351 A | 6/1974 | Lancz |
| 3,849,316 A | 11/1974 | Motley et al. |
| 3,953,337 A | 4/1976 | Walker et al. |
| 4,140,650 A | 2/1979 | Wilde |
| 4,141,843 A | 2/1979 | Watson |
| 4,172,800 A | 10/1979 | Walker |
| 4,217,231 A | 8/1980 | King |
| 4,280,943 A | 7/1981 | Bivens et al. |
| 4,519,923 A | 5/1985 | Hori et al. |
| 4,561,985 A | 12/1985 | Glass, Jr. |
| 4,588,032 A | 5/1986 | Weigand et al. |
| 4,626,362 A | 12/1986 | Dickert et al. |
| 4,658,036 A | 4/1987 | Schilling |
| 4,687,516 A | 8/1987 | Burkhalter et al. |
| 4,704,214 A | 11/1987 | Russell et al. |
| 4,719,021 A | 1/1988 | Branch, III |
| 4,842,065 A | 6/1989 | McClure |
| 5,007,489 A | 4/1991 | Enright et al. |
| 5,016,711 A | 5/1991 | Cowan |
| 5,105,885 A | 4/1992 | Bray et al. |
| 5,109,042 A | 4/1992 | Stephens |
| 5,275,654 A | 1/1994 | Cowan |
| 5,298,070 A | 3/1994 | Cowan |
| 5,314,022 A | 5/1994 | Cowan et al. |
| 5,330,662 A | 7/1994 | Jahnke et al. |
| 5,348,993 A | 9/1994 | Daeumer et al. |
| 5,399,548 A | 3/1995 | Patel et al. |
| 5,474,701 A | 12/1995 | Jaquess et al. |
| RE35,163 E | 2/1996 | Christensen et al. |
| 5,586,608 A | 12/1996 | Clark et al. |
| 5,593,953 A | 1/1997 | Malchow |
| 5,593,954 A | 1/1997 | Malchow |
| 5,602,082 A | 2/1997 | Hale et al. |
| 5,618,780 A | 4/1997 | Argillier et al. |
| 5,728,210 A | 3/1998 | Moran et al. |
| 5,744,432 A | 4/1998 | Barnhorst et al. |
| 5,850,880 A | 12/1998 | Moran et al. |
| 5,996,693 A | 12/1999 | Heathman |
| 6,063,737 A | 5/2000 | Haberman et al. |
| 6,258,756 B1 | 7/2001 | Hayatdavoudi |
| 6,632,779 B1 | 10/2003 | Vollmer et al. |
| 6,803,346 B1 | 10/2004 | Bailey et al. |
| 6,972,274 B1 | 12/2005 | Slikta et al. |
| 6,974,852 B2 | 12/2005 | Stanger et al. |
| 7,081,438 B2 | 7/2006 | Horton |
| 7,262,152 B2 | 8/2007 | Monfreux-Gaillard et al. |
| 7,318,477 B2 | 1/2008 | Hou |
| 7,435,706 B2 | 10/2008 | Mueller et al. |
| 7,799,742 B2 | 9/2010 | Dino |
| 7,893,010 B2 | 2/2011 | Ali et al. |
| 7,951,755 B2 | 5/2011 | Wu et al. |
| 8,252,728 B2 | 8/2012 | Karagianni et al. |

(56) References Cited

U.S. PATENT DOCUMENTS

| | | |
|---|---|---|
| 8,403,051 B2 | 3/2013 | Huang et al. |
| 8,563,479 B2 | 10/2013 | Amanullah et al. |
| 8,703,658 B2 | 4/2014 | Smith |
| 8,741,989 B2 | 6/2014 | Martin et al. |
| 8,932,997 B2 | 1/2015 | Merli et al. |
| 8,936,111 B2 | 1/2015 | Maghrabi et al. |
| 9,006,151 B2 | 4/2015 | Amanullah et al. |
| 9,034,800 B2 | 5/2015 | Harris et al. |
| 9,127,192 B2 | 9/2015 | Maghrabi et al. |
| 9,175,205 B2 | 11/2015 | Amanullah et al. |
| 2001/0027880 A1 | 10/2001 | Brookey |
| 2003/0017953 A1 | 1/2003 | Horton et al. |
| 2003/0127903 A1 | 7/2003 | Quintero |
| 2004/0108113 A1 | 6/2004 | Luke et al. |
| 2004/0144537 A1 | 7/2004 | Reddy et al. |
| 2005/0049147 A1 | 3/2005 | Patel et al. |
| 2006/0111245 A1 | 5/2006 | Carbajal et al. |
| 2006/0174805 A1 | 8/2006 | Chatterji et al. |
| 2006/0183842 A1 | 8/2006 | Johnson |
| 2006/0254770 A1 | 11/2006 | Hou |
| 2007/0015678 A1 | 1/2007 | Rodrigues et al. |
| 2007/0093393 A1 | 4/2007 | Navarrete et al. |
| 2008/0006404 A1 | 1/2008 | Reddy et al. |
| 2008/0171671 A1 | 7/2008 | Mueller et al. |
| 2008/0194432 A1 | 8/2008 | Heidlas et al. |
| 2008/0217064 A1 | 9/2008 | Stoian et al. |
| 2008/0308011 A1 | 12/2008 | Brothers et al. |
| 2009/0042746 A1 | 2/2009 | Bailey |
| 2009/0200033 A1 | 8/2009 | Kakadjian et al. |
| 2009/0260885 A1 | 10/2009 | Pomerleau |
| 2010/0016180 A1 | 1/2010 | Scoggins et al. |
| 2010/0152067 A1 | 6/2010 | McDonald |
| 2010/0152068 A1 | 6/2010 | Hartshorne et al. |
| 2010/0263863 A1 | 10/2010 | Quintero et al. |
| 2010/0319915 A1 | 12/2010 | Bustos et al. |
| 2010/0326660 A1 | 12/2010 | Ballard et al. |
| 2011/0306524 A1 | 12/2011 | Smith |
| 2012/0000708 A1 | 1/2012 | van Zanten et al. |
| 2012/0018226 A1 | 1/2012 | Nzeadibe et al. |
| 2012/0241155 A1 | 9/2012 | Ali et al. |
| 2012/0329683 A1 | 12/2012 | Droger et al. |
| 2013/0079256 A1 | 3/2013 | Yang |
| 2013/0092376 A1 | 4/2013 | Al-Subhi et al. |
| 2013/0153232 A1 | 6/2013 | Bobier et al. |
| 2013/0244913 A1 | 9/2013 | Maberry et al. |
| 2013/0303410 A1 | 11/2013 | Wagle et al. |
| 2013/0303411 A1 | 11/2013 | Wagle et al. |
| 2014/0024560 A1 | 1/2014 | Gonzalez Poche et al. |
| 2014/0024561 A1 | 1/2014 | Reddy |
| 2014/0073540 A1 | 3/2014 | Berry et al. |
| 2014/0102809 A1 | 4/2014 | King et al. |
| 2014/0121135 A1 | 5/2014 | Gamage et al. |
| 2014/0213489 A1 | 7/2014 | Smith |
| 2014/0318785 A1 | 10/2014 | Reddy et al. |
| 2014/0332212 A1 | 11/2014 | Ayers et al. |
| 2015/0024975 A1 | 1/2015 | Wagle et al. |
| 2015/0034389 A1 | 2/2015 | Perez |
| 2015/0080273 A1 | 3/2015 | Hatchman et al. |
| 2015/0087563 A1 | 3/2015 | Brege et al. |
| 2015/0159073 A1 | 6/2015 | Assmann et al. |
| 2015/0240142 A1 | 8/2015 | Kefi et al. |
| 2015/0299552 A1 | 10/2015 | Zamora et al. |
| 2016/0009981 A1 | 1/2016 | Teklu et al. |
| 2016/0024370 A1 | 1/2016 | Ba geri et al. |
| 2016/0069159 A1 | 3/2016 | Teklu et al. |
| 2016/0177169 A1 | 6/2016 | Zhang |
| 2016/0186032 A1 | 6/2016 | Yu et al. |
| 2016/0237340 A1 | 8/2016 | Pandya et al. |
| 2016/0289529 A1 | 10/2016 | Nguyen |
| 2017/0009125 A1 | 1/2017 | Shaffer et al. |
| 2018/0223162 A1 | 8/2018 | Al-Yami et al. |
| 2018/0265763 A1 | 9/2018 | Leotaud et al. |

FOREIGN PATENT DOCUMENTS

| | | |
|---|---|---|
| CA | 2594108 A1 | 9/2008 |
| CA | 2810345 A1 | 3/2012 |
| CA | 2745017 A1 | 12/2012 |
| CN | 102120158 A | 7/2011 |
| CN | 101240218 B | 12/2011 |
| CN | 102041138 B | 12/2011 |
| CN | 102321461 A | 1/2012 |
| CN | 102382697 A | 3/2012 |
| CN | 102373042 B | 8/2013 |
| CN | 102464974 B | 8/2013 |
| CN | 103320203 A | 9/2013 |
| CN | 102500141 B | 1/2014 |
| CN | 103571599 A | 2/2014 |
| CN | 102899152 B | 4/2014 |
| CN | 102899154 B | 4/2014 |
| CN | 102977940 B | 11/2014 |
| CN | 104130839 A | 11/2014 |
| CN | 104559954 A | 4/2015 |
| CN | 103551925 B | 7/2015 |
| CN | 102373053 B | 8/2015 |
| CN | 103571578 B | 8/2015 |
| CN | 104830513 A | 8/2015 |
| CN | 104877749 A | 9/2015 |
| CN | 104910881 A | 9/2015 |
| CN | 105038737 A | 11/2015 |
| CN | 103757640 B | 12/2015 |
| CN | 105112036 A | 12/2015 |
| CN | 103773041 B | 1/2016 |
| CN | 105441051 A | 3/2016 |
| CN | 104449893 B | 5/2016 |
| CN | 103555304 B | 6/2016 |
| CN | 105623814 A | 6/2016 |
| CN | 105778992 A | 7/2016 |
| CN | 105861135 A | 8/2016 |
| EP | 108546 A2 | 5/1984 |
| EP | 243067 A2 | 10/1987 |
| EP | 265563 A1 | 5/1988 |
| EP | 296655 A1 | 12/1988 |
| EP | 315243 A1 | 5/1989 |
| EP | 331158 A2 | 9/1989 |
| EP | 395815 A1 | 11/1990 |
| EP | 1213270 B1 | 2/2005 |
| EP | 2708586 A1 | 3/2014 |
| GB | 2205748 A | 12/1988 |
| GB | 2283036 A | 4/1995 |
| GB | 2343447 A | 5/2000 |
| JP | 07109472 A | 4/1995 |
| WO | 8911516 A1 | 11/1989 |
| WO | 9402565 A1 | 2/1994 |
| WO | 9530818 A1 | 11/1995 |
| WO | 9640836 A1 | 12/1996 |
| WO | 9730142 A1 | 8/1997 |
| WO | 9836151 A1 | 8/1998 |
| WO | 9907816 A1 | 2/1999 |
| WO | 0123703 A1 | 4/2001 |
| WO | 03093641 A1 | 11/2003 |
| WO | 2004076561 A1 | 9/2004 |
| WO | 2006012622 A2 | 2/2006 |
| WO | 2006120151 A2 | 11/2006 |
| WO | 2007003885 A3 | 5/2007 |
| WO | 2007118328 A1 | 10/2007 |
| WO | 2008081158 A2 | 7/2008 |
| WO | 2009060405 A1 | 5/2009 |
| WO | 2009138383 A1 | 11/2009 |
| WO | 2010030275 A1 | 3/2010 |
| WO | 2012101594 A1 | 8/2012 |
| WO | 2012158645 A1 | 11/2012 |
| WO | 2013055843 A1 | 4/2013 |
| WO | 2013154435 A1 | 10/2013 |
| WO | 2014107391 A1 | 7/2014 |
| WO | 2014164381 A1 | 10/2014 |
| WO | 2014193507 A1 | 12/2014 |
| WO | 2015000077 A1 | 1/2015 |
| WO | 2015006101 A1 | 1/2015 |
| WO | 2015038117 A1 | 3/2015 |

(56) References Cited

FOREIGN PATENT DOCUMENTS

| WO | 2015041649 A1 | 3/2015 |
|---|---|---|
| WO | 2016189062 A1 | 12/2016 |

OTHER PUBLICATIONS

Office Action dated Apr. 8, 2019 pertaining to U.S. Appl. No. 15/660,118, filed Jul. 26, 2017, 76 pgs.
U.S. Office Action dated Apr. 11, 2019 pertaining to U.S. Appl. No. 15/628,892, filed Jun. 21, 2017, 34 pgs.
U.S. Notice of Allowance dated Apr. 24, 2019 pertaining to U.S. Appl. No. 15/485,724, filed Apr. 12, 2017, 23 pgs.
U.S. Notice of Allowance dated Apr. 26, 2019 pertaining to U.S. Appl. No. 15/489,930, filed Apr. 18, 2017, 14 pgs.
Notice of Allowance and Fee(s) Due dated May 15, 2019 pertaining to U.S. Appl. No. 15/922,077, filed Mar. 15, 2018, 27 pgs.
Office Action dated Jun. 10, 2019 pertaining to U.S. Appl. No. 15/920,879, filed Mar. 14, 2018, 29 pgs.
Office Action dated Jun. 12, 2019 pertaining to U.S. Appl. No. 16/002,669, filed Jun. 7, 2018, 33 pgs.
Office Action dated Jun. 14, 2019 pertaining to U.S. Appl. No. 15/489,854, filed Apr. 18, 2017, 20 pgs.
Office Action dated Jun. 24, 2019 pertaining to U.S. Appl. No. 16/037,493, filed Jul. 17, 2018, 31 pgs.
Notice of Allowance and Fee(s) Due dated Jul. 22, 2019 pertaining to U.S. Appl. No. 15/922,065, filed Mar. 15, 2018, 27 pgs.
Notice of Allowance and Fee(s) Due dated Jul. 31, 2019 pertaining to U.S. Appl. No. 15/628,892, filed Jun. 21, 2017, 19 pgs.
Office Action dated Aug. 12, 2019 pertaining to U.S. Appl. No. 15/612,397, filed Jun. 2, 2017, 45 pgs.
Final Rejection dated Aug. 5, 2019 pertaining to U.S. Appl. No. 15/586,543, filed May 4, 2017, 38 pgs.
Office Action dated Jul. 30, 2019 pertaining to U.S. Appl. No. 15/581,136, filed Apr. 28, 2017, 29 pgs.
U.S. Office Action dated Jul. 3, 2019 pertaining to U.S. Appl. No. 15/496,794, filed Apr. 25, 2017, 52 pgs.
U.S. Office Action dated Jul. 2, 2019 pertaining to U.S. Appl. No. 15/586,555, filed May 4, 2017, 92 pgs.
Tridecyl Alcohol Ethoxylate, 2016, retrieved Jun. 28, 2019 from http://webcache.goggleusercontent.com/search?q=cache:OiTX5lz527kJ:https://emochemicals.com/Ethoxylates/Ethoxylates/TRIDECYL-ALCOHOL-ETHOXYLATE&hl=en&gl=us&strip=1&vwsrc=0 (Year: 2016).
U.S. Office Action dated Jul. 2, 2019 pertaining to U.S. Appl. No. 16/039,525, filed Jul. 19, 2018, 75 pgs.
Akkutlu et al., "Molecular Dynamics Simulation of Adsorpotion from Microemulsions and Surfactant Micellar Solutions at Solid-Liquid, Liquid-Liquid and Gas-Liquid Interfaces", Tech Connector World Innovation Conference & Expo, Jun. 15-18, 2014, Washington D.C.
Fraser, Greig, "Method for Determining the Bioconcentration Factor of Linear Alcohol Ethoxylates", SPE Offshore Europe Oil and Gas Conference and Exhibition, Aberdeen, GB, Sep. 8-11, 2009, Society of Petroleum Engineers.
Inoue et al., "Interactions Between Engine Oil Additive", J. Japan Petrol. Inst., 1981, 24 (2), 101-107.
Joshi et al., "Physiochemical Behaviour of Ternary System Based on Coconut Oil/C12/E8/n-pentanol/Water", J. Surface Sci. Technol., 2013, 29 (1-2), 1-13.
Lim, Jongchoo, "Solubilization of Mixture of Hydrocarbon Oils by C12e 8 Nonionic Surfactant Solution", Journal of the Korean Industrial and Engineering Chemistry, 2008, 19, 59-65.
Luan et al., "Foaming Property for Anionic-Nonionic Gemini Surfactant of Polyalkoxylated Ether Sulfonate", Oilfield Chemistry, Tsinghua Tongfang Knowledge Network Technology Co., Ltd., 2006.
Min et al., "Research on Coking Dust Wettability of Strong Cohesiveness and Easy Mudding", Safety in Coal Mines, Tsinghua Tongfang Knowledge Network Technology Co., Ltd., 2006.

Mitchell et al., "Measurement of HTHP Fluid-Loss Equipment and Test Fluids with Thermocouples", American Association of Drilling Engineers, AADE Drilling Fluids Conference, Houston TX, Apr. 6-7, 2004.
Nelson, Erik B., "Well Cementing Fundamentals", Oilfield Review, Summer 2012, vol. 24, No. 2, 59-60, Schlumberger.
Paswan et al., "Development of Jatropha oil-in-water emulsion drilling mud system", Journal of Petroleum Science and Engineering, 2016, vol. 144, p. 10-18.
Sun et al., "Synthesis and Salt Tolerance Determination of Aliphatic Alcohol Polyoxyethylene Ethers Sulfonate Series", Journal of Chemical Industry & Engineering, Tsinghua Tongfang Knowledge Network Technology Co., Ltd., 2006.
International Search Report and Written Opinion pertaining to International Application No. PCT/US2018/014986 filed Jan. 24, 2018.
International Search Report and Written Opinion pertaining to International Application No. PCT/US2018/015191 filed Jan. 25 2018.
International Search Report and Written Opinion Petaining to International Application No. PCT/US2018/015140.
International Search Report and Written Opinion dated Apr. 3, 2018 Petaining to International Application No. PCT/US2018/016182 pp. 1-13.
Non-Final Office Action dated Jan. 16, 2018 pertaining to U.S. Appl. No. 15/485,479, filed Apr. 12, 2017.
Non-Final Office Action dated Apr. 30, 2018 pertaining to U.S. Appl. No. 15/586,543, filed May 4, 2017.
Non-Final Office Action dated May 1, 2018 pertaining to U.S. Appl. No. 15/496,794, filed Apr. 25, 2017.
"International Search Report and Written Opinion dated Apr. 3, 2018, pertaining to International Application PCT/US2018/016447, filed Feb. 1, 2018, 14 pages".
"International Search Report and Written Opinion dated Apr. 20, 2018, pertaining to International Application PCT/US2018/016365, filed Feb. 1, 2018, 16 pages".
"International Search Report and Written Opinion dated Apr. 20, 2018, pertaining to International Application PCT/US2018/016414, filed Feb. 1, 2018, 14 pages".
"International Search Report and Written Opinion dated Apr. 16, 2018, pertaining to International Application PCT/US2018/016415, filed Feb. 1, 2018, 13 pages".
Shell Chemicals, HLB numbers, solvent miscibility and emulsification characteristics of NEODOL ethoxylates, retrieved Apr. 26, 2018 from https://www.shel.com/business-customers/chemicals/our-products/higher-olefins-and-derivatives/neodol-alchols-and-ethoxylates/_jcr_contents/par/tabbedcontent/tab_1780231844/textimage.
Non-Final Office Action dated May 4, 2018 pertaining to U.S. Appl. No. 15/628,892, filed Jun. 21, 2017.
"International Search Report and Written Opinion dated May 8, 2018 pertaining to International Application No. PCT/US2018/015631".
"International Search Report and Written Opinion dated May 14, 2018 pertaining to International Application No. PCT/US2018/015640 filed Jan. 29, 2018, 16 pages".
"International Search Report and Written Opinion dated May 9, 2018 pertaining to International Application No. PCT/US2018/015638 filed Jan. 29, 2018, 15 pages".
Non-Final Office Action dated May 25, 2018 pertaining to U.S. Appl. No. 15/485,724, 6 pages.
"International Search Report and Written Opinion dated May 29, 2018 pertaining to International Application No. PCT/US2018/015207 filed Jan. 25, 2018, 15 pages".
International Search Report and Written Opinion dated May 25, 2018, pertaining to International Application No. PCT/US2018/016167, filed Jan. 31, 2018, 20 pages.
Office Action pertaining to U.S. Appl. No. 15/489,927 dated Jul. 6, 2018.
Office Action pertaining to U.S. Appl. No. 16/002,672 dated Sep. 14, 2018.
Office Action pertaining to. U.S. Appl. No. 16/002,669 dated Sep. 21, 2018.

(56) References Cited

OTHER PUBLICATIONS

Final Rejection dated Oct. 9, 2018 pertaining to U.S. Appl. No. 15/496,794.
Sabicol TA Series Synthetic Alcohol Ethoxylates, SGS, 2013, pp. 1-3, retrieved Sep. 28, 2018 from http://www.latro.com.tr/upload/1499842623-t2.pdf (Year:2013).
Office Action dated Dec. 12, 2018 pertaining to U.S. Appl. No. 15/581,136, filed Apr. 28, 2017.
Office Action dated Dec. 19, 2018 pertaining to U.S. Appl. No. 15/489,930, filed Apr. 18, 2017.
Notice of Allowance and Fee(s) Due dated Jan. 8, 2019 pertaining to U.S. Appl. No. 15/485,479, filed Apr. 12, 2017.
Office Action dated Jan. 17, 2019 pertaining to U.S. Appl. No. 15/485,724, filed Apr. 12, 2017.
Office Action dated Feb. 11, 2019 pertaining to U.S. Appl. No. 15/496,794, filed Apr. 25, 2017, 16 pgs.
Office Action dated Feb. 11, 2019 pertaining to U.S. Appl. No. 15/920,879, filed Mar. 14, 2018, 68 pgs.
Office Action dated Feb. 7, 2019 pertaining to U.S. Appl. No. 16/002,669, filed Jun. 7, 2018, 54 pgs.
Office Action dated Feb. 21, 2019 pertaining to U.S. Appl. No. 16/037,493, filed Jul. 17, 2018, 52 pgs.
Office Action dated Jan. 24, 2019 pertaining to U.S. Appl. No. 15/489,854, filed Apr. 18, 2017, 46 pgs.
Office Action dated Feb. 5, 2019 pertaining to U.S. Appl. No. 15/612,397, filed Jun. 2, 2017, 67 pgs.
Office Action dated Feb. 27, 2019 pertaining to U.S. Appl. No. 15/922,077, filed Mar. 15, 2018, 69 pgs.
Notice of Allowance and Fee(s) Due dated Feb. 21, 2019 pertaining to U.S. Appl. No. 15/489,927, filed Apr. 18, 2017, 27 pgs.
Office Action dated Mar. 13, 2019 pertaining to U.S. Appl. No. 15/922,065, filed Mar. 15, 2018, 77 pgs.
Office Action dated Mar. 27, 2019 pertaining to U.S. Appl. No. 15/581,136, filed Apr. 28, 2017, 20 pgs.

DEVELOPMENT OF ANTI-BIT BALLING FLUIDS

CROSS-REFERENCE TO RELATED APPLICATIONS

This application is a continuation of U.S. Non-Provisional patent application Ser. No. 15/922,077 filed Mar. 15, 2018, which is a divisional of U.S. Non-Provisional patent application Ser. No. 15/485,479 filed Apr. 12, 2017 which claims U.S. Provisional Patent Application Ser. No. 62/454,189 filed Feb. 3, 2017 and U.S. Provisional Patent Application Ser. No. 62/454,192 filed Feb. 3, 2017, both of which are incorporated by reference herein in their entirety.

TECHNICAL FIELD

Embodiments of the present disclosure generally relate to anti-bit balling drilling fluids and methods of making and using these fluids. Specifically, embodiments of the present disclosure relate to anti-bit balling fluids containing a surfactant or a polyethylene glycol, drilling fluids containing a surfactant or a polyethylene glycol, and methods of making and using these fluids to control bit balling tendencies.

BACKGROUND

In the oil drilling industry, bit balling refers to a buildup of cuttings from clay (also known as shale) that may adhere to a drill bit. Drill "cuttings" are broken bits of solid materials produced as rock or soil is broken apart that must be continuously removed from the borehole during drilling. Bit balling may occur at almost any time, and may result in a reduction in the rate of penetration, reduced surface torque of the drill bit, and an increase in stand pipe pressure. As clay accumulates and bit balling increases, drilling will slow and, eventually, may have to be stopped for the drill bit to be cleaned.

Conventional additives or coatings may be used to control bit balling tendencies; however, most additives require an oil phase in the drilling fluid or require an emulsified drilling fluid to be effective. The oil phase in the fluid may provide lubrication necessary for the additives to function. Some anti-bit balling additives also require a particular pH range and cloud point range to be compatible with the drilling fluids used. Additionally, the efficacy of conventional additives and coatings is lacking, often requiring the drill to be frequently removed and cleaned before drilling can proceed.

BRIEF DESCRIPTION OF THE DRAWINGS

The following detailed description of specific embodiments of the present disclosure can be best understood when read in conjunction with the following drawings, where like structure is indicated with like reference numerals and in which.

SUMMARY

Figure 1A:
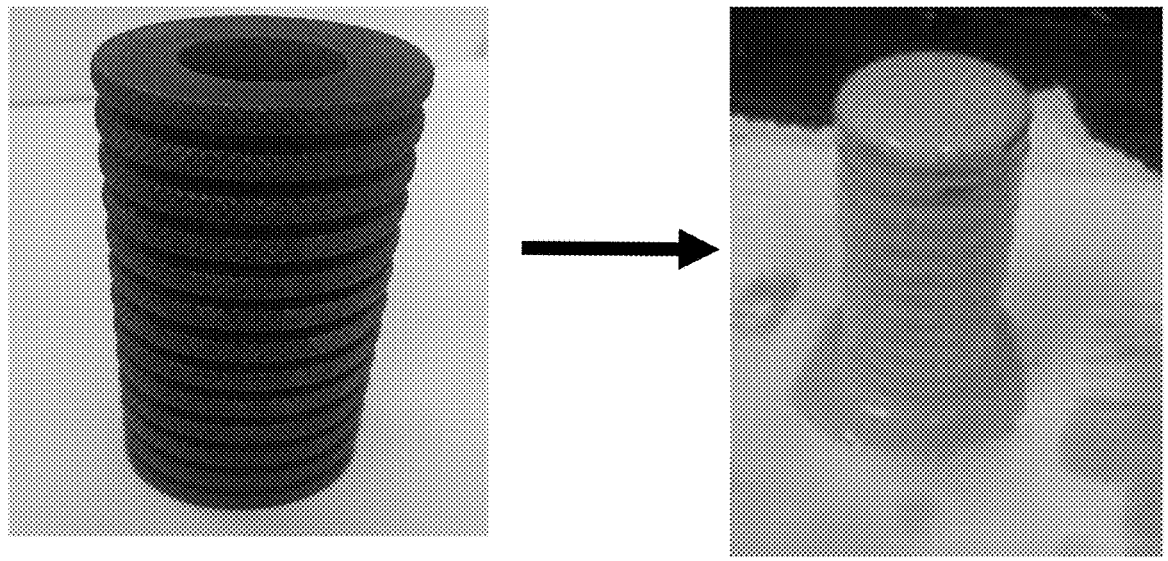
FIG. 1A is a photograph of the accretion tube results for a prior art comparative example.

Accordingly, an ongoing need exists for anti-bit balling drilling fluids that effectively reduce and prevent bit balling without requiring drilling fluid containing an oil phase or emulsified drilling fluid. The present embodiments provide anti-bit balling drilling fluids and methods of making and using these fluids that address these concerns.

In some embodiments, anti-bit balling drilling fluids are provided that contain water, a clay-based component, a surfactant having the formula: $R\text{---}(OC_2H_4)_x\text{---}OH$, where R is a hydrocarbyl group having from 10 to 20 carbon atoms and x is an integer from 1 and 10, or a polyethylene glycol having the formula: $H\text{---}(O\text{---}CH_2\text{---}CH_2)_n\text{---}OH$, where n is an integer from 1 to 50. In some embodiments, the surfactant may have an HLB of from 8 to 16.

In further embodiments, methods of producing a drilling fluid are provided. The methods include mixing water, a clay-based component, a surfactant having the formula: $R\text{---}(OC_2H_4)_x\text{---}OH$, where R is a hydrocarbyl group having from 10 to 20 carbon atoms and x is an integer from 1 and 10, or a polyethylene glycol having the formula: $H\text{---}(O\text{---}CH_2\text{---}CH_2)_n\text{---}OH$, where n is an integer from 1 to 50 to produce a drilling fluid.

In still further embodiments, methods of using a drilling fluid in drilling operations are provided. The methods include mixing water, a clay-based component, a surfactant having the formula: $R\text{---}(OC_2H_4)_x\text{---}OH$, where R is a hydrocarbyl group having from 10 to 20 carbon atoms and x is an integer from 1 and 10, or a polyethylene glycol having the formula: $H\text{---}(O\text{---}CH_2\text{---}CH_2)_n\text{---}OH$, where n is an integer from 1 to 50 to produce a drilling fluid, and introducing the drilling fluid to a subterranean formation.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

Embodiments of the present disclosure are directed to anti-bit balling drilling fluids containing water, a clay-based component, and at least one of either a surfactant having Formula (I):

$$R\text{---}(OC_2H_4)_x\text{---}OH \qquad \text{Formula (I)}$$

where R is a hydrocarbyl group with 10 to 20 carbons and x is an integer from 1 and 10, or a polyethylene glycol having Formula (II):

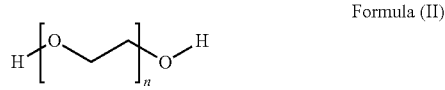

Formula (II)

where n is an integer from 1 to 50.

As a non-limiting example, the anti-bit balling drilling fluids of the present disclosure may be used in the oil and gas drilling industries, such as for drilling in oil and gas wells. Oil and gas wells may be formed in subterranean portions of the Earth, sometimes referred to as subterranean geological formations. The wellbore may serve to connect natural resources, such as petrochemical products, to a ground level surface. In some embodiments, a wellbore may be formed in the geological formation, for instance, by a drilling procedure. To drill a subterranean well or wellbore, a drill string including a drill bit and drill collars to weight the drill bit is inserted into a predrilled hole and rotated to cut into the rock at the bottom of the hole, producing rock cuttings. Commonly, the drilling fluid, known as "drilling mud," may be utilized during the drilling process. To remove the rock cuttings from the bottom of the wellbore, drilling fluid is pumped down through the drill string to the drill bit. The drilling fluid may cool and lubricate the drill bit and may provide hydrostatic pressure in the wellbore to provide support to the sidewalls of the wellbore and prevent the sidewalls from collapsing and caving in on the drill string and to prevent fluids in the downhole formations from flowing into the wellbore during drilling operations. The drilling fluid may also lift the rock cuttings away from the drill bit and upwards as the drilling fluid is recirculated back to the surface. The drilling fluid may transport rock cuttings from the drill bit to the surface, which can be referred to as "cleaning" the wellbore.

The rock or drill "cuttings" are broken bits of solid materials produced as rock or soil is broken apart that must be continuously removed from the borehole during drilling. The cuttings may vary based on the drilling application, and in some instances may include clay (shale), rock, or soil pieces. These pieces often begin to agglomerate, forming a dense slurry that may build up on the drill bit. The increasing use of water-based drilling fluids aggravates bit balling problems, as water from the drilling fluid may be absorbed by the cuttings, exacerbating their tendency to stick to the drill bit. Clay cuttings may be particularly susceptible to cause bit balling problems due to the plastic limit, or water content, of clay.

Clay may be classified based on the Attenberg limits, which differentiate three phases of clay based on water content: the liquid limit, plastic limit, and plastic index. The liquid limit is the threshold moisture content at which the clay is so saturated with moisture that it begins to wash away in an almost-liquid form. Clay at its liquid limit is a muddy liquid that is easily washed from a drill bit. The plastic index of clay refers to the lowest moisture content at which the clay may be rolled into threads one eighth of an inch in diameter without breaking into pieces. This clay does not contain much moisture and is in an almost-solid form. Clay at its plastic index is easily brushed away from the drill bit as chalky residue, and is also not generally problematic. Finally, the plastic limit of clay refers to the state between the liquid limit and the plastic index, in which the clay contains enough water to impart stickiness to the clay without adding so much water that the clay forms a liquid. This plastic limit may also be referred to as the "danger zone" of the clay due to the problems caused by the thick nature and sticky texture of the clay. Clay at the plastic limit is often a viscous, gummy slurry that is very difficult to manipulate.

Embodiments of the present disclosure relate to anti-bit balling drilling fluids containing at least one surfactant or a polyethylene glycol that may reduce the tendency of bit balling by preventing and reducing the accumulation of cuttings and the adhesion of the cuttings to a drill bit. According to some embodiments, the surfactant may have the chemical structure of Formula (I):

$$R\text{---}(OC_2H_4)_x\text{---}OH \qquad \text{Formula (I)}$$

In Formula (I), R is a hydrocarbyl group having from 10 to 20 carbon atoms and x is an integer from 1 to 10. As used in this disclosure, a "hydrocarbyl group" refers to a chemical group consisting of carbon and hydrogen. Typically, a hydrocarbyl group may be analogous to a hydrocarbon molecule with a single missing hydrogen (where the hydrocarbyl group is connected to another chemical group). The hydrocarbyl group may contain saturated or unsaturated carbon atoms in any arrangement, including straight (linear), branched, or combinations of any of these configurations. The hydrocarbyl R group in some embodiments may be an alkyl (—CH$_3$), alkenyl (—CH═CH$_2$), or alkynyl (—C≡CH) group.

In some embodiments, R may have from 10 to 20 carbons, such as from 10 to 18 carbons, from 10 to 16 carbons, from 10 to 14 carbons, from 10 to 12 carbons, or from 12 to 20 carbons, or from 12 t 15 carbons, or from 14 to 20 carbons, or from 16 to 20 carbons, or from 18 to 20 carbons, or from 12 to 16 carbons, or from 12 to 15, or from 12 to 14 carbons. In some embodiments, R may have 12 carbons, or 13 carbons, or 14 carbons or 15 carbons. In some particular embodiments, R may have 13 carbons, and, in some embodiments, R may be $C_{13}H_{27}$ (isotridecyl) or may contain an isotridecyl group.

In Formula (I), x is an integer between 1 and 10. In some embodiments, x may be 1, 2, 3, 4, 5, 6, 7, 8, 9, or 10. In some embodiments, x may be an integer from 5 to 10, from 5 and 9, from 7 to 10, or from 7 to 9. In some embodiments, x may be an integer greater than or equal to 5, such as an integer greater than or equal to 7, or greater than or equal to 8.

The surfactant may be amphiphilic, meaning that it has a hydrophobic tail (the non-polar R group) and a hydrophilic head (the polar —OH groups from ethylene oxide and the alcohol group) that may lower the surface tension between two liquids or between a liquid. In some embodiments, the surfactant may have a hydrophilic-lipophilic balance (HLB) of from 8 to 16. Without being bound by any particular theory, the HLB of the compound is the measure of the degree to which it is hydrophilic or lipophilic, which may be determined by calculating values for the regions of the molecules in accordance with the Griffin Method in accordance with Equation 1:

$$HLB = 20 \times \frac{M_h}{M} \qquad \text{Equation 1}$$

In Equation 1, $M_h$ is the molecular mass of the hydrophilic portion of the molecule and M is the molecular mass of the entire molecule. The resulting HLB value gives a result on a scale of from 0 to 20 in which a value of 0 indicates to a completely hydrophobic/lipophilic molecule and a value of 20 corresponds to a completely hydrophilic/lipophobic molecule. Generally, a molecule having an HLB of less than 10 is lipid-soluble (and thus water-insoluble) and a molecule having an HLB of greater than 10 is water-soluble (and thus lipid-insoluble).

In some embodiments, the surfactant may have an HLB of from 8 to 16, such as from 10 to 16, or from 12 to 16, or from 13 to 16, or from 14 to 16. In some embodiments, the surfactant may have an HLB of from 15 to 16, or from 12 to 15, or from 13 to 15, or from 14 to 15. The surfactant may have an HLB of from 11 to 12, or 12 to 13, or 13 to 14, or 14 to 15, or 15 to 16. The HLB value may indicate that the surfactant has both hydrophilic and lipophilic affinities (as the surfactant is amphiphilic) but has a slightly greater tendency towards being hydrophilic/lipophobic, and thus, may be at least partially water-soluble. An HLB value of from 13 to 15 may indicate that the surfactant is able to act as a detergent. Without being bound by any particular theory, the surfactant may aid in dispersing the balled shale cuttings produced by the drill. The HLB of the surfactant may allow the molecule to function as a detergent, producing a dispersing affect and reducing the ability of the shale cuttings to adhere to the bit surface.

The surfactant may be a reaction product of a fatty alcohol ethoxylated with ethylene oxide. As used throughout the disclosure, a fatty alcohol refers to a compound having a hydroxyl (—OH) group and at least one alkyl chain (—R) group. The ethoxylated alcohol compound may be made by reacting a fatty alcohol with ethylene oxide. The ethoxylation reaction in some embodiments may be conducted at an elevated temperature and in the presence of an anionic catalyst, such as potassium hydroxide (KOH), for example. The ethoxylation reaction may proceed according to Equation 2:

$$ROH + xC_2H_4O \xrightarrow{KOH} R(OCH_2CH_2)_xOH \qquad \text{Equation 2}$$

The fatty alcohols used as the reactant in Equation 2 to make the ethoxylated alcohol compound could include any alcohols having formula R—OH, where R is a saturated or unsaturated, linear, or branched hydrocarbyl group having from 10 to 20 carbon atoms, from 10 to 16 carbon atoms, or from 12 to 14 carbon atoms. In some embodiments, R may be a saturated linear hydrocarbyl group. Alternatively, the fatty alcohol may include R that is a branched hydrocarbyl group.

In some embodiments, the R—OH group of the surfactant may be a naturally-derived or synthetically-derived fatty alcohol. Non-limiting examples of suitable fatty alcohols may include, but are not limited to capryl alcohol, perlargonic alcohol, decanol (decyl alcohol), undecanol, dodecanol (lauryl alcohol), tridecanol (tridecyl alcohol), myristyl alcohol (1-tetradecanol), pentadecanol (pentadecyl alcohol), cetyl alcohol, palmitoleyl alcohol, heptadecanol (heptadecyl alcohol) stearyl alcohol, nonadecyl alcohol, arachidyl alcohol, other naturally-occurring fatty alcohols, other synthetic fatty alcohols, or combinations of any of these. In some embodiments, the fatty alcohol may be decanol (decyl alcohol) or tridecanol (tridecyl alcohol).

The fatty alcohol may be a naturally occurring fatty alcohol, such as a fatty alcohol obtained from natural sources, such as animal fats or vegetable oils, like coconut oil. The fatty alcohol may be a hydrogenated naturally-occurring unsaturated fatty alcohol. Alternatively, the fatty alcohol may be a synthetic fatty alcohol, such as those obtained from a petroleum source through one or more synthesis reactions. For example, the fatty alcohol may be produced through the oligomerization of ethylene derived from a petroleum source or through the hydroformylation of alkenes followed by hydrogenation of the hydroformylation reaction product.

As shown in Equation 2, the reaction product may have the general chemical formula R—(OCH$_2$CH$_2$)$_x$—OH, where R is a saturated or unsaturated, linear or branched hydrocarbyl group having from 5 to 20 carbon atoms. According to some embodiments, the R group may be an iso-tridecyl group (—C$_{13}$H$_{27}$), as depicted in Chemical Structure A. It should be understood that Chemical Structure A depicts one possible embodiment of the surfactant of Formula (I) in which the R group is an iso-tridecyl group, which is used as a non-limiting example. In some embodiments, Chemical Structure (A) may have 8 ethoxy groups (that is, x equals 8 in Chemical Structure (A)) such that the surfactant is a tridecyl alcohol ethyoxylate with an 8:1 molar ratio of ethylene oxide condensate to branched isotridecyl alcohol having the chemical formula C$_{13}$H$_{27}$—(OCH$_2$CH$_2$)$_8$—OH.

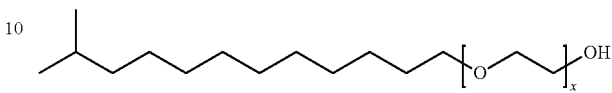

Chemical Structure (A)

Generally, an x:1 molar ratio of the fatty alcohol to the ethylene oxide may be utilized to control the level of ethoxylation in Equation 2. In some embodiments, x may be from 1 to 10, such as 1, 2, 3, 4, 5, 6, 7, 8, 9, or 10. In some embodiments, the surfactant may be the reaction product of fatty alcohol ethoxylated with ethylene oxide at an 8:1 molar ratio of fatty alcohol to ethylene oxide. In some particular embodiments, the surfactant may be a synthetic alcohol oxylate and may be an ethylene oxide condensate of isotridecyl alcohol. The surfactant may be produced by an 8:1 molar ratio of ethylene oxide to isotridecyl alcohol. In some particular embodiments, the surfactant may be produced by an 8:1 molar ratio of ethylene oxide condensate to synthetic branched isotridecyl alcohol.

The anti-bit balling drilling fluid may alternatively or additionally contain a polyethylene glycol having Formula (II):

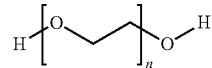

Formula (II)

In Formula (II), n is an integer from 1 to 50. In some embodiments, n may be varied to achieve the desired molecular weight of the polyethylene glycol produced. In some embodiments, n may be from 1 to 35, or from 1 to 20, or from 1 to 10, or from 10 to 50, or from 25 to 50. The polyethylene glycol may have a weight average molecular weight of from 200 grams per mol (g/mol) to 1500 g/mol, as measured according to gel permeation chromatography (GPC). In some embodiments, the polyethylene glycol may have a weight average molecular weight of from 200 to 1000 g/mol, or 200 to 500 g/mol, or 250 to 500 g/mol, or 300 to 450 g/mol, or 250 to 450 g/mol, or 350 to 450 g/mol. In some embodiments, the polyethylene glycol may have a weight average molecular weight of from 180 to 220 g/mol, or 280 to 320 g/mol, or 380 to 420 g/mol, or 580 to 620 g/mol, or 1180 to 1220 g/mol, or 1480 to 1520 g/mol. In some embodiments, the polyethylene glycol may have a weight average molecular weight of 200 g/mol, or 300 g/mol, or 400 g/mol, or 600 g/mol, or 1200 g/mol, or 1500 g/mol.

Without being bound by any particular theory, the molecular weight of the polyethylene glycol may help to provide lubrication to the drill bit surface. The polyethylene glycol may lubricate the drill bit without requiring use of an oil phase in the drilling fluid or use of an emulsified drilling fluid. The adhesion of clay to the drill bit may be caused, at least in part, by electro-chemical attraction of both the clay to the metal drill bit and, as the clay accumulates, clay to clay interactions. Moreover, the surface of the metal bit may be water-wet, and clay has molecular layers of water adsorbed on its surface. It is believed that the clay may adhere to bits and drill collars when forced into intimate contact by the force and weight of the drill string due to water molecules between the drill bit and the clay forming hydrogen bonds. The polyethylene glycol and the surfactant both act to reduce the surface tension, decreasing the accretion of cuttings to the bit surface. Furthermore, the polyethylene glycol is non-polar and may eliminate the polarity of the hydrogen bonding, reducing the adhesion of the clay to the bit surface.

In some embodiments, the drilling fluid may contain from 0.1 wt % to 10 wt % of the surfactant, the polyethylene glycol, or both based on the total weight of the drilling fluid. The drilling fluid may contain from 0.01 wt % to 20 wt % of the surfactant based on the total weight of the drilling fluid. The drilling fluid may contain from 0.02 lb/bbl to 180 lb/bbl of the surfactant based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the surfactant.

Likewise, the drilling fluid may contain from 0.02 lb/bbl to 180 lb/bbl of the polyethylene glycol based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the polyethylene glycol.

In some embodiments, the drilling fluid may contain from 0.1 wt % to 10 wt %, or from 1 wt % to 10 wt % of the combined total of the surfactant and the polyethylene glycol. The drilling fluid may contain may contain from 0.02 lb/bbl to 180 lb/bbl of the surfactant and the polyethylene glycol based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the surfactant and the polyethylene glycol.

The clay-based component of the drilling fluid may be any clay-based material or mud suitable for use in drilling fluids, which may vary based on the application of use. In some embodiments, the clay-based component may contain, for instance, lime (CaO), $CaCO_3$, bentonite, montmorillonite clay, barium sulfate (barite), hematite ($Fe_2O_3$), mullite ($3Al_2O_3.2SiO_2$ or $2Al_2O_3.SiO_2$), kaolin, ($Al_2Si_2O_5(OH)_4$ or kaolinite), alumina ($Al_2O_3$, or aluminum oxide), silicon carbide, tungsten carbide, and combinations thereof. In some embodiments, the clay-based component may be bentonite. Without being bound by any particular theory, use of a clay-based component may increase the viscosity and rheology of the drilling fluid to allow for better drill lubrication, shear strength, and transportation of cuttings.

The drilling fluid may contain from 0.01 wt % to 80 wt % of the clay-based component based on the total weight of the drilling fluid. The drilling fluid may contain from 28 to 720 lb/bbl of the clay-based component based on the total weight of the drilling fluid. In some embodiments, the drilling fluid may contain from 28 to 700 lb/bbl, or 50 to 700 lb/bbl, or 100 to 700 lb/bbl, or 200 to 500 lb/bbl of the clay-based component.

The drilling fluid may include water along with the clay-based material. The water may be distilled water, deionized water, or tap water. In some embodiments, the water may contain additives or contaminants. For instance, the water may include freshwater or seawater, natural or synthetic brine, or salt water. In some embodiments, salt or other organic compounds may be incorporated into the water to control certain properties of the water, and thus the drilling fluid, such as density. Without being bound by any particular theory, increasing the saturation of water by increasing the salt concentration or the level of other organic compounds in the water may increase the density of the water, and thus, the drilling fluid. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides and combinations of these. In some particular embodiments, brine may be used in the aqueous phase. Without being bound by any particular theory, brine may be used to create osmotic balance between the drilling fluid and the subterranean formation.

The drilling fluid may contain from 10 wt % to 95 wt % water based on the total weight of the drilling fluid. In some embodiments, the drilling fluid may contain from 28 to 850 lb/bbl of water based on the total weight of the drilling fluid. The drilling fluid may contain from 28 lb/bbl to 810 lb/bbl, from 30 to 800 lb/bbl, from 50 to 800 lb/bbl, from 75 to 800 lb/bbl, or from 100 to 800 lb/bbl of water. In some embodiments, the drilling fluid may contain from 200 to 800, or 300 to 600, or 500 to 810 lb/bbl of the oleaginous phase. In some embodiments, the drilling fluid may contain from 28 to 630 lbs/bbl, such as from 30 to 600 lbs/bbl, from 50 to 500 lbs/bbl, from 100 to 500 lb/bbl, or 200 to 500 lbs/bbl of water.

Without being bound by any particular theory, the water content may allow the drilling fluid to have proper flowability, ensuring that the clay-based material is not overly viscous, nor overly thin. In some embodiments, the drilling fluid may have about the density of water, which may allow for increased amounts of water in the drilling fluid. Similarly, in some embodiments, the drilling fluid may have a density that exceeds 150 pounds per cubic foot ($lbs/ft^3$), allowing minimal amounts of water in the drilling fluid.

In some embodiments, the drilling fluid may also contain at least one additive. The one or more additives may be any additives known to be suitable for drilling fluids. As non-limiting examples, suitable additives may include weighting agents, fluid loss control agents, lost circulation control agents, other surfactants, antifoaming agents, supplemental emulsifiers, weighting agent, fluid loss additives, viscosity adjusters, an alkali reserve, specialty additives, and combinations of these.

One or more additives may be incorporated into the drilling fluid to enhance one or more characteristics of the drilling fluid. A viscosifier, also referred to as a rheology modifier, may be added to the drilling fluid to impart non-Newtonian fluid rheology to the drilling fluid to facilitate lifting and conveying rock cuttings to the surface of the wellbore. Examples of viscosifiers may include, but are not limited to polyacrylamide, polyanionic cellulose, or combinations of these. In some embodiments, the drilling fluid may include xanthan gum, a polysaccharide commonly referred to as XC polymer. The XC polymer may be added to the water-based drilling fluid to produce a flat velocity profile of the water-based drilling fluid in annular flow, which may help to improve the efficiency of the drilling fluid, in particular lower density drilling fluids, in lifting and conveying rock cuttings to the surface.

In some embodiments, the drilling fluid may contain from 0.01 wt % to 20 wt % of the one or more additives based on the total weight of the drilling fluid. The drilling fluid may contain from 0.02 lb/bbl to 180 lb/bbl of the one or more additives based on the total weight of the drilling fluid, such as from 0.02 to 150 lb/bbl, or from 0.05 to 150 lb/bbl. In some embodiments, the drilling fluid may contain from 0.1 to 150 lb/bbl, or from 0.1 to 100 lb/bbl, or from 1 to 100 lb/bbl of the one or more additives. In some particular embodiments, the drilling fluid may include from 0.025 to 1 lb/bbl of the XC polymer. In embodiments, the drilling fluid may include from 0.025 to 10 lb/bbl starch.

In some embodiments, the one or more additives may include solids, sometimes referred to as weighting material, which may be dispersed in the drilling fluid. The solids may be finely divided solids having a high specific gravity (SG) that may be added to the drilling fluid to increase the density of the drilling fluid. Examples of weighting materials suitable for use as the solid include, but are not limited to, barite (minimum SG of 4.20 grams per centimeter cubed ($g/cm^3$)), hematite (minimum SG of 5.05 $g/cm^3$), calcium carbonate (minimum SG of 2.7-2.8 $g/cm^3$), siderite (minimum SG of 3.8 $g/cm^3$), ilmenite (minimum SG of 4.6 $g/cm^3$), other weighting materials, or any combination of these weighting materials. In some embodiments, the drilling fluid may include barite as the solid.

In embodiments, the drilling fluid may have a solids content of from 1 wt % to 80 wt % based on the weight of the solid weighing material based on the total weight of the drilling fluid. The drilling fluid may have a solids content of from 2.5 lb/bbl to 720 lb/bbl, such as from 2.5 to 720 lb/bbl, or 2.5 to 700 lb/bbl. In some embodiments, the drilling fluid may have a solids content of from 5 to 700 lb/bbl, from 50 to 500 lb/bbl, or from 100 to 600 lb/bbl.

As stated, the addition of solids may be used to control the density of the drilling fluid. In some embodiments, the drilling fluid may have a density of from 50 pounds of mass per cubic foot (pcf) to 160 pcf, as measured using Fann Model 140 Mud Balance according to ASTM Standard D4380. For instance, the drilling fluid may have a density of from 63 pcf to 150 pcf, from 50 pcf to 140 pcf, from 55 pcf to 160 pcf, from 60 pcf to 150 pcf, from 60 pcf to 140 pcf, from 100 pcf to 160 pcf, from 70 pcf to 150 pcf, or from 70 pcf to 100 pcf. The drilling fluid may have a density that is greater than or equal to 50 pcf, greater than or equal to 70 pcf, or greater than or equal to 100 pcf. In some embodiments, the drilling fluid may have a density of from 120 pcf to 160 pcf.

Embodiments of the disclosure additionally relate to methods of producing an anti-bit balling drilling fluid. The produced drilling fluids may be in accordance with any of the embodiments previously described. The method may include mixing water, a clay-based component, and at least one of a surfactant having Formula (I) or a polyethylene glycol having Formula (II), in accordance with any of the embodiments previously described.

In some embodiments, the mixture may be mixed at a shear speed of from 300 rotations per minute (RPM) to 11500 RPM, such as from 300 RPM to 600 RPM, or from 600 RPM to 900 RPM. The mixture may be sheared at 10000 RPM for from 10 minutes to 100 minutes, such as from 10 minutes to 15 minutes, or from 20 minutes to 40 minutes, or from 60 minutes to 80 minutes.

Embodiments of the disclosure may also relate to method for using the drilling fluid in drilling operations. The drilling fluid may be in accordance with any of the embodiments previously described. In some embodiments, the drilling fluid may be introduced into a subterranean formation. Introducing may involve injecting the drilling fluid into the subterranean formation. In some embodiments, the drilling fluid may be injected through a drill string to a drill bit and recirculating the drilling fluid. In some embodiments the subterranean formation may be a well. The drilling fluid may at least be partially circulated within the subterranean formation. Recirculating the fluid may allow the drilling fluid to cool and lubricate the drill bit and to lift rock cuttings away from the drill bit, carrying the cuttings upwards to the surface to clean the wellbore. The drilling fluid may additionally provide hydrostatic pressure to support the sidewalls of the wellbore and prevent the sidewalls from collapsing onto the drill string.

As previously described, the drilling fluid of the present embodiments may reduce the tendency for bit-balling to occur on a drill bit. Bit-balling refers to the accumulation of cuttings on the drill bit, which slow and even stop the drill bit from properly performing. The tendency for cuttings to accumulate may be referred to as the accretion percentage, or the percentage of growth of the cuttings (or other components) to accumulate on the drill bit. In some particular applications, it may be desirable to maintain an accretion percentage of less than or equal to 20% to ensure optimal drilling conditions. In some embodiments the drilling fluid of the present embodiments may produce an accretion percentage of less than or equal to 20%, such as less than or equal to 18%, less than or equal to 16%, such as less than or equal to 15%, less than or equal to 14%, less than or equal to 12%, less than or equal to 10%, or less than or equal to 5%.

EXAMPLES

The anti-bit balling drilling fluids of the present disclosure may have improved anti-bit balling characteristics over conventional drilling fluids, which may, in some embodiments, be due in part to the surfactant, the polyethylene glycol, or in some embodiments, both.

Table 1 lists 6 different suitable examples of the polyethylene glycol of the present disclosure, Polyethylene Glycol Examples (PG Ex.) 1 to 6.

TABLE 1

| Suitable Polyethylene Glycol Examples | | | | | | |
|---|---|---|---|---|---|---|
| Property | PG Ex. 1 | PG Ex. 2 | PG Ex. 3 | PG Ex. 4 | PG Ex. 5 | PG Ex. 6 |
| Molecular Weight g/mol | 200 | 300 | 400 | 600 | 1200 | 1500 |
| Appearance at 25° C. | Clear Viscous Liquid | Clear Viscous Liquid | Clear Viscous Liquid | Clear Viscous Liquid | Solid | Solid |
| Hydroxyl No. (mgKOH/g) | 535-590 | 356-394 | 267-295 | 178-197 | 89-99 | 70.5-83 |

TABLE 1-continued

Suitable Polyethylene Glycol Examples

| Property | PG Ex. 1 | PG Ex. 2 | PG Ex. 3 | PG Ex. 4 | PG Ex. 5 | PG Ex. 6 |
|---|---|---|---|---|---|---|
| Water %, Max. | 0.5 | 0.5 | 0.5 | 0.5 | 0.5 | 0.5 |
| Color (APHA) at 25° C., Max. | 40 | 40 | 40 | 40 | 50 | 50 |
| pH at 25° C. in Aq. Soln. | 4.5-7.5 | 4.5-7.5 | 4.5-7.5 | 4.5-7.5 | 4.5-7.5 | 4.5-7.5 |
| Density at 25° C., g/mL | 1.1238 | 1.12-1.13 | 1.1255 | 1.1258 | 1.0919 | 1.0919 |
| Freezing Range ° C. | Sets to glass below-65 | 5-9 | 4-8 | 17-12 | 42-46 | 42-46 |
| Flash Point ° C. | >150 | >150 | >150 | >220 | >240 | >240 |
| Ash Content %, Max. | 0.1 | 0.1 | 0.1 | 0 | 0.1 | 0.1 |

The accretion properties of several samples were tested to compare drilling fluids of the present embodiments with conventional drilling fluids that did not contain the surfactant or the polyethylene glycol of the present disclosure. Four formulations were tested, with two comparative examples and two examples that were in accordance with the embodiments previously described. The composition of each formulation is listed in Tables 2 to 5. The composition was continuously mixed using a Hamilton Beach Model HMD 400 mixer at 11500 RPM shear. The time each component was added to the mixture is also listed.

TABLE 2

Formulation of Comparative Example 1 - Drilling Fluid Without Anti- Bit Balling Additives

| Component | Time Added | Amount |
|---|---|---|
| Water | 0 minutes | 308 cubic centimeters (cc) |
| Deformer | 0 minutes | 2 drops |
| XC Polymer[1] | 15 minutes | 0.75 grams (g) |
| PAC-R[2] | 15 minutes | 2 g |
| Starch | 15 minutes | 6 g |
| Lime | 10 minutes | 2 g |
| CaCO$_3$ (fine) | 5 minutes | 35 g |
| Calibrated Bentonite | 5 minutes | 30 g |
| RevDust[3] | 5 minutes | 5 g |

[1]Xanthan gum polymer, commercially available from M-I Swaco (Houston, TX)
[2]Polyanionic cellulose, commercially available from M-I Swaco (Houston, TX)
[3]Ground calcium montmorillonite clay, commercially available from Milwhite, Inc. (Brownsville, TX)

TABLE 3

Formulation of Comparative Example 2 - Drilling Fluid With Conventional Anti-Bit-Balling Additive

| Component | Time Added | Amount |
|---|---|---|
| Water | 0 minutes | 308 cc |
| Deformer | 0 minutes | 2 drops |
| XC Polymer[1] | 15 minutes | 0.75 g |
| PAC-R[2] | 15 minutes | 2 g |
| Starch | 15 minutes | 6 g |
| Commercial lubricant[4] | 10 minutes | 1 g |
| Lime | 10 minutes | 2 g |
| CaCO$_3$ (fine) | 5 minutes | 35 g |
| Calibrated Bentonite | 5 minutes | 30 g |
| RevDust[3] | 5 minutes | 5 g |

[1]Xanthan gum polymer, commercially available from M-I Swaco (Houston, TX)
[2]Polyanionic cellulose, commercially available from M-I Swaco (Houston, TX)
[3]Ground calcium montmorillonite clay, commercially available from Milwhite, Inc. (Brownsville, TX)
[4]LUBE 167, commercially available from M-I Swaco (Houston, TX)

TABLE 4

Formulation of Example 1 - Drilling Fluid With Polyethylene Glycol as Anti-Bit Balling Additive

| Component | Time Added | Amount |
|---|---|---|
| Water | 0 minutes | 308 cc |
| Deformer | 0 minutes | 2 drops |
| XC Polymer[1] | 15 minutes | 0.75 g |
| PAC-R[2] | 15 minutes | 2 g |
| Starch | 15 minutes | 6 g |
| Polyethylene glycol | 10 minutes | 1 g |
| Lime | 10 minutes | 2 g |
| CaCO$_3$ (fine) | 5 minutes | 35 g |
| Calibrated Bentonite | 5 minutes | 30 g |
| RevDust[3] | 5 minutes | 5 g |

1Xanthan gum polymer, commercially available from M-I Swaco (Houston, TX)
2Polyanionic cellulose, commercially available from M-I Swaco (Houston, TX)
3Ground calcium montmorillonite clay, commercially available from Milwhite, Inc. (Brownsville, TX)

TABLE 5

Formulation of Example 2 - Drilling Fluid With Surfactant as Anti-BitBalling Additive

| Component | Time Added | Amount |
|---|---|---|
| Water | 0 minutes | 308 cc |
| Deformer | 0 minutes | 2 drops |
| XC Polymer[1] | 15 minutes | 0.75 g |
| PAC-R[2] | 15 minutes | 2 g |
| Starch | 15 minutes | 6 g |
| Ethylene oxide condensate of synthetic branched ethoxylates | 10 minutes | 1 g |
| Lime | 10 minutes | 2 g |

TABLE 5-continued

Formulation of Example 2 - Drilling Fluid With Surfactant as Anti-BitBalling Additive

| Component | Time Added | Amount |
|---|---|---|
| CaCO₃ (fine) | 5 minutes | 35 g |
| Calibrated Bentonite | 5 minutes | 30 g |
| RevDust³ | 5 minutes | 5 g |

1Xanthan gum polymer, commercially available from M-I Swaco (Houston, TX)
2Polyanionic cellulose, commercially available from M-I Swaco (Houston, TX)
3Ground calcium montmorillonite clay, commercially available from Milwhite, Inc. (Brownsville, TX)

For each of the four formulations, the drilling fluid was prepared and a pre-weighed Monel® nickel alloy accretion tube was added to the formulation. The drilling fluid and accretion tube were hot rolled at 150° F. for 4 hours. The drilling fluid was allowed to cool to room temperature (about 72° F.) and was stirred for 30 seconds on a Hamilton Beach HMD 400 multi-mixer at low shear between 1000 RPM and 1200 RPM. The accretion tube was set on a screen and the mud was allowed to drain from the tube for 10 seconds, upon which the tube was again weighed. The weight of the mud remaining on the tube was determined by subtracting the final weight after 10 seconds of mud run-off from the initial weight of the dry tube. The accretion results are listed in Table 6.

TABLE 6

Accretion Results

| Formulation | Weight of dry accretion tube (Initial Weight) | Weight of Accretion tube after hot rolling (Final Weight) | Difference in weight (Mud remaining on tube) | Accretion Percentage |
|---|---|---|---|---|
| Comparative Example 1 | 120.68 g | 141.81 g | 21.13 g | 17.51% |
| Comparative Example 2 | 120.47 g | 138.85 g | 18.38 g | 15.26% |
| Example 1 | 120.61 g | 138.75 g | 18.14 g | 15.04% |
| Example 2 | 120.57 g | 138.22 g | 17.72 g | 14.64% |

To further demonstrate the results of the accretion tests, photographs were taken of both the dry accretion tube and the accretion tube after 10 seconds, as previously described.

FIG. 1A is a photograph of the accretion tube results of Comparative Example 1. Comparative Example 1 was a drilling fluid without an anti-bit balling additive. The dry accretion tube had a starting dry weight of 120.68 g, shown on the left in FIG. 1A. Comparative Example 1 was hot rolled in the tube for 4 hours, placed on a screen, and the mud was allowed to drain for 10 seconds. After 10 seconds, the photograph on the right was taken and the accretion tube was weighed at 141.81 g. As shown in FIG. 1A, the drilling fluid is clinging to the accretion tube and even pooling at the bottom of the screen. Over 20 g of mud remained on the accretion tube.

Figure 1B:
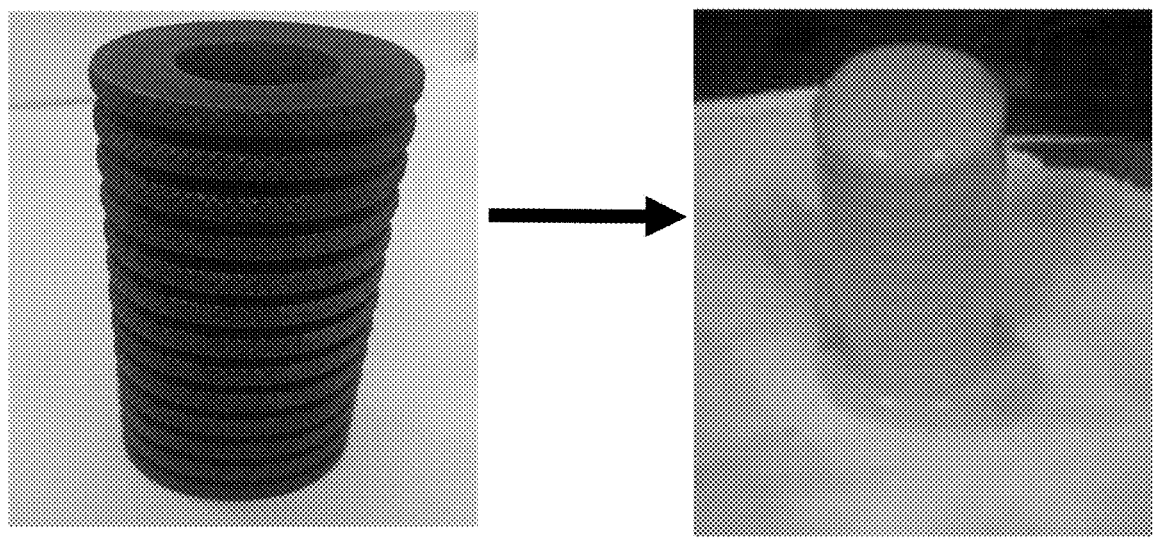
FIG. 1B is a photograph of the accretion tube results of another prior art comparative example.

FIG. 1B is a photograph of the accretion tube results of Comparative Example 2. Comparative Example 2 was a drilling fluid containing a conventional anti-bit balling additive, Lube-167, a water-based lubricant commercially available from M-I Swaco (Houston, Tex.). The dry accretion tube had a starting dry weight of 120.47 g, shown on the left in FIG. 1B. Comparative Example 2 was hot rolled in the tube for 4 hours, placed on a screen, and the mud was allowed to drain for 10 seconds. After 10 seconds, the photograph on the right was taken and the accretion tube was weighed at 138.85 g. As shown in FIG. 1B, the drilling fluid of Comparative Example 2 is covering the accretion tube and again is pooling at the bottom of the screen. About 18.4 g of mud remained on the accretion tube.

Figure 2A:
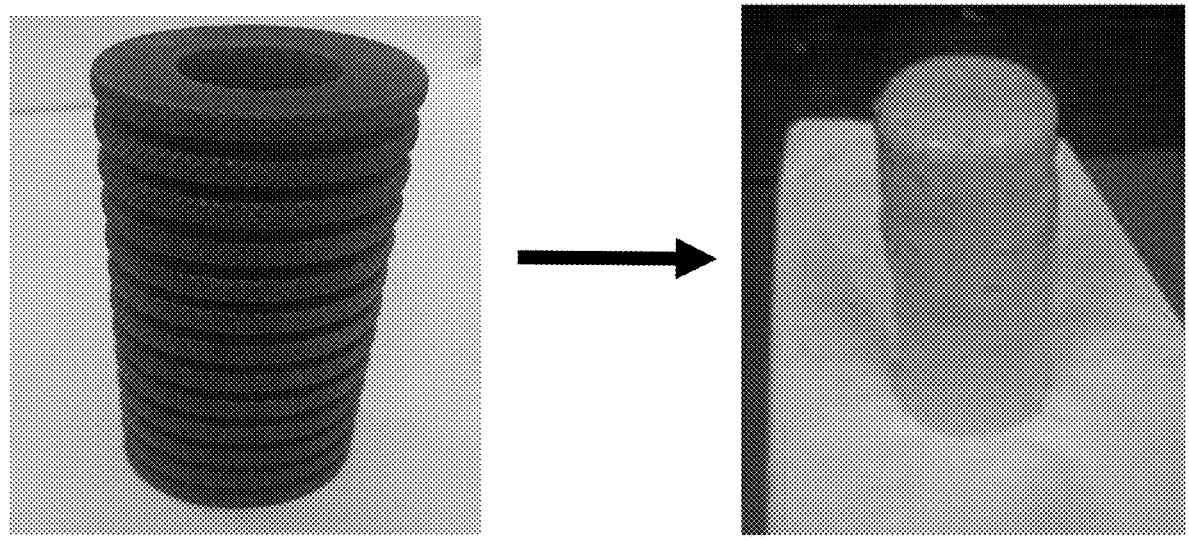
FIG. 2A is a photograph of the accretion tube results of an example according to the anti-bit balling drilling fluid formulations shown and described in this disclosure.

FIG. 2A is a photograph of the accretion tube results of Example 1 of the present disclosure. Example 1 was a drilling fluid utilizing a polyethylene glycol of the present disclosure as an anti-bit balling additve. The dry accretion tube had a starting dry weight of 120.61 g, shown on the left of FIG. 2A. Example 1 was hot rolled in the tube for 4 hours, placed on a screen, and the mud was allowed to drain for 10 seconds. After 10 seconds, the photograph on the right was taken and the accretion tube was weighed at 138.75 g. As shown in FIG. 2A, the drilling fluid of Example 1 is not clinging to the groves in the accretion tube and does not pool at the bottom of the screen. About 18.2 g of mud remained on the accretion tube.

Figure 2B:
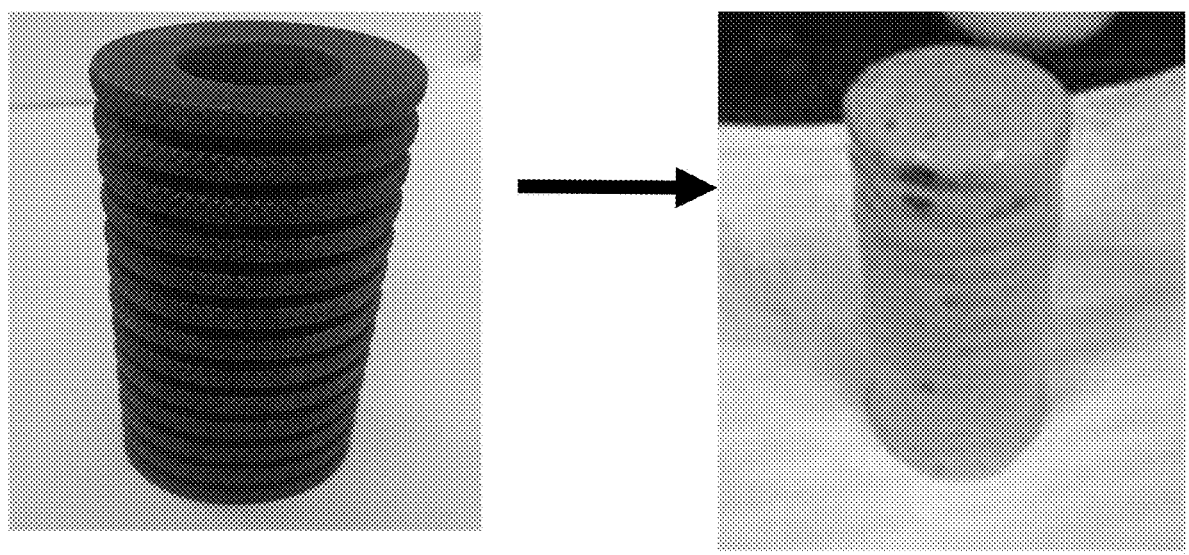
FIG. 2B is a photograph of the accretion tube results of another example according to the anti-bit balling drilling fluid formulations shown and described in this disclosure.

Finally, FIG. 2B is a photograph of the accretion tube results of Example 2 of the present disclosure. Example 2 was a drilling fluid utilizing a surfactant of the present disclosure as an anti-bit balling additive. The dry accretion tube had a starting dry weight of 120.57 g, shown on the left in FIG. 2B. Example 2 was hot rolled in the tube for 4 hours, placed on a screen, and the mud was allowed to drain for 10 seconds. After 10 seconds, the photograph on the right was taken and the accretion tube was weighed at 138.22 g. As shown in FIG. 2B, the drilling fluid of Example 2 is not clinging to the accretion tube and does not pool at the bottom of the screen, and enough drilling fluid has been drained from the tube such that portions of the tube are again visible. Only about 17.2 g of mud remained on the accretion tube after the 10 second drain.

A first aspect of the disclosure is directed to an anti-bit balling fluid comprising at least one of a surfactant comprising the formula: R—(OC₂H₄)ₓ—OH, where R is a hydrocarbyl group having from 10 to 20 carbon atoms, x is an integer from 1 and 10, or a polyethylene glycol comprising Formula (II):

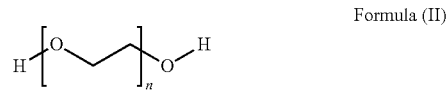

Formula (II)

where n is an integer from 1 to 50.

A second aspect of the disclosure includes the first aspect, where the surfactant has a hydrophilic-lipophilic balance (HLB) of from 8 to 16.

A third aspect of the disclosure includes the first or second aspects, where R comprises 13 carbon atoms.

A fourth aspect of the disclosure includes any of the first through third aspects, where the drilling fluid comprises from 28 to 810 lb/bbl of the oleaginous phase based on the total weight of the drilling fluid.

A fifth aspect of the disclosure includes any of the first through fourth aspects, where R is an isotridecyl ($C_{13}H_{27}$) group.

A sixth aspect of the disclosure includes any of the first through fifth aspects, where x is from 5 to 10.

A seventh aspect of the disclosure includes any of the first through sixth aspects, where x is from 7 to 9.

An eighth aspect of the disclosure includes any of the first through seventh aspects, where the surfactant has an HLB of from 13 to 15.

A ninth aspect of the disclosure includes any of the first through eighth aspects, where the surfactant is a naturally-derived fatty alcohol.

A tenth aspect of the disclosure includes any of the first through ninth aspects, where the surfactant is a synthetically-derived fatty alcohol.

An eleventh aspect of the disclosure includes any of the first through tenth aspects, where the surfactant comprises ethylene oxide condensate of branched isotridecyl alcohol.

A twelfth aspect of the disclosure includes any of the first through eleventh aspects, where the polyethylene glycol has a weight average molecular weight of from 300 grams per mol (g/mol) to 500 g/mol, as measured according to gel permeation chromatography (GPC).

A thirteenth aspect of the disclosure includes any of the first through twelfth aspects, where the anti-bit balling fluid comprises from 0.02 to 180 pounds per barrel (lb/bbl) of the surfactant based on the total weight of the anti-bit balling fluid.

A fourteenth aspect of the disclosure includes any of the first through thirteenth aspects, where the anti-bit balling fluid comprises from 0.02 to 180 lb/bbl of the polyethylene glycol based on the total weight of the anti-bit balling fluid.

A fifteenth aspect of the disclosure is directed to a drilling fluid comprising: water; a clay-based component; and at least one of a surfactant comprising the formula: R—(OC$_2$H$_4$)$_x$—OH, where R is a hydrocarbyl group having from 10 to 20 carbon atoms, x is an integer from 1 and 10, or a polyethylene glycol comprising Formula (II):

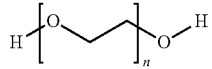

Formula (II)

where n is an integer from 1 to 50.

A sixteenth aspect of the disclosure includes the fifteenth aspect, where the surfactant has an HLB of from 8 to 16.

A seventeenth aspect of the disclosure includes any of the fifteenth through sixteenth aspects, where R is: an alkyl group comprising 12 to 15 carbons; or an alkenyl group comprising from 12 to 15 carbon atoms.

An eighteenth aspect of the disclosure includes any of the fifteenth through seventeenth aspects, where R comprises 13 carbon atoms.

A nineteenth aspect of the disclosure includes any of the fifteenth through eighteenth aspects, where R comprises an isotridecyl (C$_{13}$H$_{27}$) group.

A twentieth aspect of the disclosure includes any of the fifteenth through nineteenth aspects, where x is from 5 to 10.

A twenty-first aspect of the disclosure includes any of the fifteenth through twentieth aspects, where x is from 7 to 9.

A twenty-second aspect of the disclosure includes any of the fifteenth through twenty-first aspects, where the surfactant has an HLB of from 13 to 15.

A twenty-third aspect of the disclosure includes any of the fifteenth through twenty-second aspects, where the surfactant is a naturally-derived fatty alcohol.

A twenty-fourth aspect of the disclosure includes any of the fifteenth through twenty-second aspects, where the surfactant is a synthetically-derived fatty alcohol.

A twenty-fifth aspect of the disclosure includes any of the fifteenth through twenty-fourth aspects, where the surfactant comprises ethylene oxide condensate of branched isotridecyl alcohol.

A twenty-sixth aspect of the disclosure includes any of the first through twenty-fifth aspects, where the polyethylene glycol has a weight average molecular weight of from 300 grams per mol (g/mol) to 500 g/mol, as measured according to GPC.

A twenty-seventh aspect of the disclosure includes any of the first through twenty-sixth aspects, where the drilling fluid comprises from 28 to 850 lb/bbl water based on the total weight of the drilling fluid.

A twenty-eighth aspect of the disclosure includes any of the first through twenty-seventh aspects, where the drilling fluid comprises from 28 to 720 lb/bbl of the clay-based component based on the total weight of the drilling fluid.

A twenty-ninth aspect of the disclosure includes any of the first through twenty-eighth aspects, where the drilling fluid comprises from 0.02 to 180 lb/bbl of the surfactant, the polyethylene glycol, or both, based on the total weight of the drilling fluid.

A thirtieth aspect of the disclosure includes any of the first through twenty-ninth aspects, where the clay-based component comprises one or more components selected from the group consisting of lime (CaO), CaCO$_3$, bentonite, montmorillonite clay, barium sulfate (barite), hematite (Fe$_2$O$_3$), mullite (3Al$_2$O$_3$.2SiO$_2$ or 2Al$_2$O$_3$—SiO$_2$), kaolin, (Al$_2$Si$_2$O$_5$(OH)$_4$ or kaolinite), alumina (Al$_2$O$_3$, or aluminum oxide), silicon carbide, tungsten carbide, and combinations thereof.

A thirty-first aspect of the disclosure includes any of the first through thirtieth aspects, further comprising at least one or more additives selected from the group consisting of weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, other specialty additives, and combinations thereof.

A thirty-second aspect of the disclosure includes any of the fifteenth through thirty-first aspects, where the drilling fluid has an accretion percentage of less than or equal to 18%.

A thirty-third aspect of the disclosure is directed to a method of producing a drilling fluid, the method comprising: mixing water, a clay-based component, and at least one of a surfactant comprising the formula: R—(OC$_2$H$_4$)$_x$—OH, where R is a hydrocarbyl group having from 10 to 20 carbon atoms, x is an integer from 1 and 10, or a polyethylene glycol comprising Formula (II):

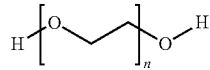

Formula (II)

where n is an integer from 1 to 50, to produce the drilling fluid.

A thirty-fourth aspect of the disclosure is directed to a method for using a drilling fluid in drilling operations, the method comprising: mixing water, a clay-based component, and at least one of a surfactant comprising the formula: R—(OC$_2$H$_4$)$_x$—OH, where R is a hydrocarbyl group having from 10 to 20 carbon atoms, x is an integer from 1 and 10, or a polyethylene glycol comprising Formula (II):

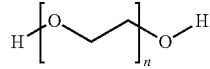

Formula (II)

where n is an integer from 1 to 50, to produce the drilling fluid, and introducing the drilling fluid to a subterranean formation.

A thirty-fifth aspect of the disclosure includes the thirty-fourth aspect, where the subterranean formation is a well.

A thirty-sixth aspect of the disclosure includes any of the thirty-fourth through thirty-fifth aspects, where introducing the drilling fluid comprises injecting the drilling fluid and at least partially circulating the drilling fluid within the subterranean formation.

A thirty-seventh aspect of the disclosure includes any of the thirty-third through thirty-sixth aspects, where the surfactant has an HLB of from 8 to 16.

A thirty-eighth aspect of the disclosure includes any of the thirty-third through thirty-seventh aspects, where R is: an alkyl group comprising 12 to 15 carbons; or an alkenyl group comprising from 12 to 15 carbon atoms.

A thirty-ninth aspect of the disclosure includes any of the thirty-third through thirty-eighth aspects, where R has 13 carbon atoms.

A fortieth aspect of the disclosure includes any of the thirty-third through thirty-ninth aspects, where R is an isotridecyl ($C_{13}H_{27}$) group.

A forty-first aspect of the disclosure includes any of the thirty-third through fortieth aspects, where x is from 5 to 10.

A forty-second aspect of the disclosure includes any of the thirty-third through forty-first aspects, where x is from 7 to 9.

A forty-third aspect of the disclosure includes any of the thirty-third through forty-second aspects, where the surfactant has an HLB of from 13 to 15.

A forty-fourth aspect of the disclosure includes any of the thirty-third through forty-third aspects, where the surfactant is a naturally-derived fatty alcohol.

A forty-fifth aspect of the disclosure includes any of the thirty-third through forty-fourth aspects, where the surfactant is a synthetically-derived fatty alcohol.

A forty-sixth aspect of the disclosure includes any of the thirty-third through forty-fourth aspects, where the surfactant comprises ethylene oxide condensate of branched isotridecyl alcohol.

A forty-seventh aspect of the disclosure includes any of the thirty-third through forty-sixth aspects, where the polyethylene glycol has a weight average molecular weight of from 300 grams per mol (g/mol) to 500 g/mol, as measured according to GPC.

A forty-eighth aspect of the disclosure includes any of the thirty-third through forty-seventh aspects, where the drilling fluid comprises from 28 to 850 lb/bbl water based on the total weight of the drilling fluid.

A forty-ninth aspect of the disclosure includes any of the thirty-third through forty-eighth aspects, where the drilling fluid comprises from 28 to 720 lb/bbl of the clay-based component based on the total weight of the drilling fluid.

A fiftieth aspect of the disclosure includes any of the thirty-third through forty-ninth aspects, where the drilling fluid comprises from 0.02 to 180 lb/bbl of the surfactant, the polyethylene glycol, or both, based on the total weight of the drilling fluid.

A fifty-first aspect of the disclosure includes any of the thirty-third through fiftieth aspects, where the clay-based component comprises one or more components selected from the group consisting of lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3$—$SiO_2$), kaolin, ($Al_2Si_2O_5(OH)_4$ or kaolinite), alumina ($Al_2O_3$, or aluminum oxide), silicon carbide, tungsten carbide, and combinations thereof.

A fifty-second aspect of the disclosure includes any of the thirty-third through fifty-first aspects, further comprising at least one or more additives selected from the group consisting of weighting agents, fluid loss control agents, lost circulation control agents, viscosifiers, dispersants, pH buffers, electrolytes, glycols, glycerols, dispersion aids, corrosion inhibitors, defoamers, deformers, starches, xanthan gum polymers, other specialty additives, and combinations thereof.

A fifty-third aspect of the disclosure includes any of the thirty-third through fifty-second aspects, where the drilling fluid has an accretion percentage of less than or equal to 18%.

The following description of the embodiments is exemplary and illustrative in nature and is in no way intended to be limiting it its application or use. As used throughout this disclosure, the singular forms "a," "an" and "the" include plural referents unless the context clearly dictates otherwise. Thus, for example, reference to "a" component includes aspects having two or more such components, unless the context clearly indicates otherwise.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments of any of these, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method for using a drilling fluid in drilling operations, the method comprising:
    mixing:
        water,
        from 50 to 700 lb/bbl of a clay-based component based on total weight of the drilling fluid, and a polyethylene glycol comprising Formula (II):

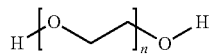
Formula (II)

where n is an integer from 1 to 50, and optionally, including at least one or more additives selected from the group consisting of weighting agents, fluid loss control agents, lost circulation control agents, viscosifiers, dispersants, pH buffers, electrolytes, glycols, glycerols, dispersion aids, corrosion inhibitors, defoamers, starches, xanthan gum polymers, and combinations thereof, to produce the drilling fluid, wherein the drilling fluid consists of the water, the clay-based component, and the polyethylene glycol, and optionally, the at least one or more additives, wherein the drilling fluid has an accretion percentage of less than or equal to 18%, and introducing the drilling fluid to a subterranean formation.

2. The method of claim 1, where introducing the drilling fluid comprises injecting the drilling fluid and at least partially circulating the drilling fluid within the subterranean formation.

3. The method of claim 1, where the drilling fluid comprises from 28 to 850 lb/bbl water and from 0.02 to 180 lb/bbl of the polyethylene glycol, based on total weight of the drilling fluid.

4. The method of claim 1, where the polyethylene glycol has a weight average molecular weight of from 300 grams per mol (g/mol) to 500 g/mol, as measured according to GPC.

5. The method of claim 1, where the drilling fluid comprises from 28 to 850 lb/bbl water based on total weight of the drilling fluid.

6. The method of claim 1, where the drilling fluid comprises from 0.02 to 180 lb/bbl of the polyethylene glycol, based on total weight of the drilling fluid.

7. The method of claim 1, where the clay-based component comprises one or more components selected from the group consisting of lime (CaO), $CaCO_3$, bentonite, montmorillonite clay, barium sulfate (barite), hematite ($Fe_2O_3$), mullite ($3Al_2O_3.2SiO_2$ or $2Al_2O_3.SiO_2$), kaolin ($Al_2Si_2O_5(OH)_4$ or kaolinite), alumina ($Al_2O_3$, or aluminum oxide), silicon carbide, tungsten carbide, and combinations thereof.

* * * * *